May 1, 1934. J. SILVERMAN 1,957,033
CANE SEAT
Filed April 21, 1932
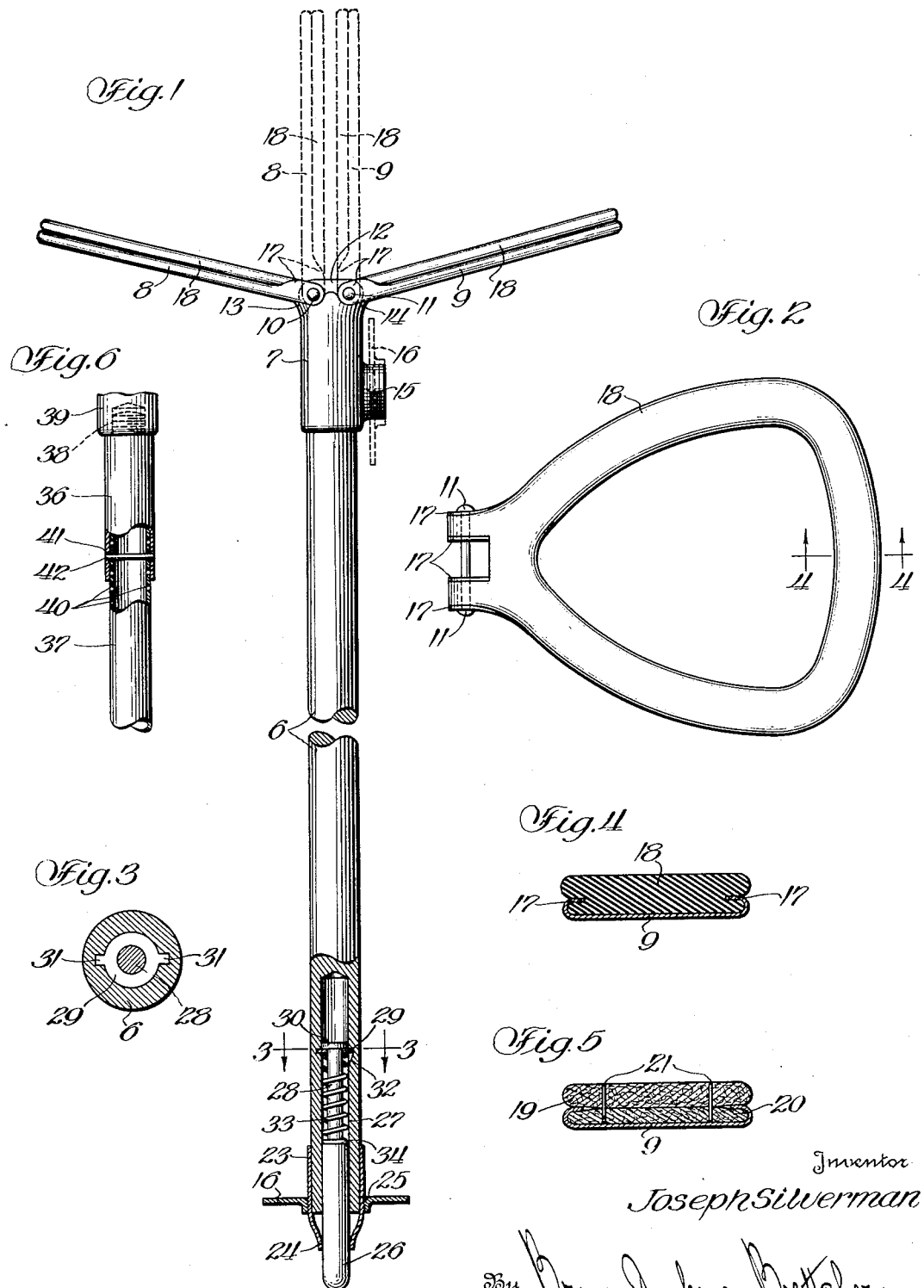
Inventor
Joseph Silverman
By Brown, Jackson, Boettcher & Wiener
Attorneys Patented May 1, 1934

1,957,033

UNITED STATES PATENT OFFICE 1,957,033

CANE SEAT

Joseph Silverman, Chicago, Ill.

Application April 21, 1932, Serial No. 606,576

6 Claims. (Cl. 155—135)

This invention relates to canes, and more particularly to canes adapted to have the handle thereof converted into a seat, commonly known as cane seats.

In the preferred embodiment of the invention, I provide a cane in which the handle, the supporting collar for the handle, and the ferrule are made of sheet metal stampings. This provides a light weight economical structure. The handle of the cane is formed of a pair of substantially channel-shaped stampings, and the faces thereof are provided with resilient material, embedded in the channel of the stampings and forming a cushioning seat. These stampings are pivotally attached to the supporting collar of the cane at the upper end thereof, and the resilient surfaces are in facing relation when the handle is folded to form a cane.

Another feature of the invention is the provision of a supporting flange which is threaded or otherwise suitably secured to the ferrule of the cane, when the cane is used as a seat, for the purpose of limiting penetration of the tip of the cane into soft ground or the like. This flange is carried upon a suitable stud adjacent the handle when the cane is not being used as a seat.

A further feature of the invention resides in the shock-absorbing spring mounting for the tip of the cane, in order to provide resiliency.

I also provide means for adjusting the length of the cane, in order to provide a proper seat to conform to the stature of the individual.

Other objects and advantages of the present invention will appear more fully from the following detailed description, which, together with the accompanying drawing, will disclose to those skilled in the art the particular construction and operation of a preferred embodiment of the invention.

In the drawing:

Figure 1 is an elevational view of the cane seat, a portion thereof being shown in sections;

Figure 2 is a detail view of one of the stampings forming the seat;

Figure 3 is a sectional view of the spring mounting at the tip of the cane, taken substantially on the line 3—3 of Figure 1;

Figure 4 is a sectional view taken substantially on the line 4—4 of Figure 2;

Figure 5 is a sectional view taken substantially on the line 4—4 of Figure 2, showing a modified resilient cushion; and Figure 6 is a fragmentary detail view showing the manner in which the length of the cane may be varied.

Referring now in more detail to the drawing, in Figure 1 I have disclosed a cane having the shaft portion 6, formed preferably of wood, although it may be of metal tubing, or other suitable or preferred material.

Adjacent the upper end of the shaft 6 is a supporting collar 7, which may be riveted, keyed, or otherwise suitably secured to the upper end of shaft 6. For instance, if the shaft 6 is of metal, the collar 7 may be threaded thereon.

Pivoted at the upper end of the collar 7 are a pair of channel-shaped metal stampings 8 and 9, which are mounted upon the pivot pins 10 and 11 carried by the collar 7.

As shown in more detail in Figure 2, the pivoted ends of the stampings 8 and 9 are bifurcated, and fit about a projecting portion 12 of the collar 7, the collar having outwardly flared portions 13 and 14 adapted to act as stops for limiting the movement of the members 8 and 9 in order to hold the members in seat forming position. The collar 7 is also provided with the threaded stud or boss 15, which carries a suitable flange, indicated in dotted lines at 16 when the cane seat is being used as a cane. The members 8 and 9 are adapted to be folded into the position shown in dotted lines in Figure 1 when it is desired to use the cane seat as a walking stick.

The handle members 8 and 9 are formed as substantially channel-shaped stampings, as shown more in detail in Figures 4 and 5, having the extending lateral edges thereof turned inwardly, as indicated at 17. These edges 17 are normal to the plane of the members adjacent the pivoted portion of the members, as shown in Figure 1, in order to provide a bearing for the pivot pins 10 and 11. The members 8 and 9 are provided with suitable resilient cushioning material, which may be a molded piece of rubber, as indicated by the numeral 18 in Figure 4, or which may be a plurality of leather strips, felt, cloth or the like, as indicated in Figure 5, in which the strips 19 and 20 are fixed together by means of the stitching 21. The lower portion of the cushioned material is embedded in the channel section, and is confined therein by means of the inwardly extending edges 17 of the channel, thus providing a resilient cushioning surface upon the upper facing portion of the handle members 8 and 9.

The lower end of the shaft 6 is provided with a ferrule 23, which preferably is a sheet metal stamping having the converging tip portion 24. The ferrule is threaded as indicated at 25 for receiving the flange 16 when it is desired to use the cane as a seat, the flange 16 limiting the penetration of the cane into the ground or the like when applied as shown in full lines in Figure 1. During transportation of the cane seat, or when the device is being used as a walking stick, the flange 16 is carried upon the stud 15.

A metal tip member 26 extends through the converging portion 24 of the ferrule 23, and is slidably mounted in a bore 27 formed in the shaft 6, the tip 26 being provided with a reduced shank 28 adapted to extend through a washer 29 positioned in the bore 27 of the shaft 6. The upper end of the shank 28 is upset or flanged, as at 30, to limit downward displacement of the tip 26. As shown more in detail in Figure 3, the washer 29 is provided with a pair of extending ears 31, which serve to secure the washer in position within the bore 27, there being a lateral groove 32 provided in the bore for the purpose of inserting the washer into position. A suitable spring member 33 encircles the reduced extending portion 28 of the tip 26, and is biased at one end against the washer 29, and normally seats upon a shoulder 34 formed between the tip 26 and the reduced portion 28 for urging the tip 26 outwardly.

It is thus apparent that the tip 26 is resiliently mounted within the shaft 6 of the cane seat, and thereby presents a tip which is yieldable in the use of the device as a walking stick. In entering the tip into the ground to permit use of the device as a seat the spring 33 may be compressed. However, the tip 26 will only extend up into the stem a sufficient distance so that the converging portion 24 of the ferrule 23 will penetrate the ground to a distance determined by the position of the flange 16 upon the ferrule. Thus, when the device is being used as a walking stick, the tip 26 affords resiliency and acts as a shock absorber, and when the device is being used as a seat, the tip 26, and the flange 16, together with the converging portion 24 of the ferrule, serves to hold the bottom of the seat in position.

In Figure 6 I have shown a shaft comprising an upper section 36 and a lower section 37, the lower section being telescoped within the upper section. The sections may be formed of relatively thin metal tubing, and the upper end of section 36 may be threaded, as at 38, to receive the supporting collar 39.

The lower section is provided, at spaced intervals, with a plurality of pairs of opposed openings 40, which openings may be alined with a pair of similar openings 41 formed at the lower end of section 36. A key or pin 42 is adapted to be forced through the openings in order to secure the shaft sections 36 and 37 in alined position, and the length of the shaft may be varied to suit the stature of the individual using the device by selecting the desired openings and inserting the pin therethrough.

The cane seat thus provided is relatively light in weight, and, because of the formation of the metal parts from sheet metal stampings, is economical in construction, and requires resilient cushioning material on only one surface of the handle members, inasmuch as the channel section provides means for securing the cushioning material in position. The seat thus provided may be made softer, because of the increased depth of the cushioning material, inasmuch as the stamping may be made relatively thin, whereas in older type of seats the cushioning material was applied about the entire surface of the handle or member, and therefore would necessitate considerable expense in order to provide the same depth as is provided in the instant invention. Further, the provision of the shock absorbing tip permits the device to be used as a walking stick or cane of improved character, and the supporting flange provides a positive means for preventing penetration of the tip into the ground for any substantial distance.

I do not intend to be limited to the exact details shown and described in connection with the preferred embodiment of my invention, but only in so far as defined by the scope and spirit of the appended claims:

I claim:

1. In a cane seat, a cane part, a pair of handle seats pivoted to the upper end of said cane part, said handle seats being adapted to swing outwardly away from one another to open position to form a seat and inwardly to closed position to form a handle, said handle seats comprising loop-shaped channel frames surrounding the handle openings and opening upwardly about said openings when the handle seats are in seating position, and seat cushioning means surrounding the handle openings and secured in the channels of said frames.

2. In a cane seat, a cane part, a pair of handle seats pivoted to the upper end of said cane part, said handle seats being adapted to swing outwardly away from one another to open position to form a seat and inwardly to closed position to form a handle, said handle seats comprising loop-shaped channel frames surrounding the handle openings and opening upwardly about said openings when the handle seats are in seating position, and seat cushioning means surrounding the handle openings and secured in the channels of said frames, the edges of said channels being turned inwardly to secure said cushioning means in said channels.

3. In a cane seat, a cane part having handle seat mounting portions at its upper end, a pair of handle seats having bifurcations fitting about and pivoted to said seat mounting portions, said handle seats being adapted to swing outwardly away from one another to open position to form a seat and inwardly to closed position to form a handle, said handle seats comprising loop shaped channel frames surrounding the handle openings and opening upwardly about said openings when the handle seats are in seating position, and seat cushioning means surrounding the handle openings and secured in the channels of said frames.

4. A cane seat comprising an upright cane part, a pair of handle seats pivoted upon the upper end of said cane part and adapted to swing outwardly away from one another into generally horizontal position to form a seat and inwardly to generally parallel relation to form a handle, said handle seats comprising frames of loop-shaped form defining handle openings through which the hand may be passed for carrying the cane seat when said handle seats are positioned in generally parallel relation, said seat frames each comprising a channel surrounding said handle openings and opening upwardly when the handle seats are in generally horizontal seating position, and seat cushioning means secured in the channels of said seat frames, said cushioning means being exposed upwardly above the open tops of said channels to provide a cushioned seat about the handle openings when the seat frames are in seating position and brought face to face and covered along the 5. A cane seat comprising an upright cane part, a pair of handle seats pivoted upon the upper end of said cane part and adapted to swing outwardly away from one another into generally horizontal position to form a seat and inwardly to generally parallel relation to form a handle, said handle seats comprising frames of loop-shaped form defining handle openings through which the hand may be passed for carrying the cane seat when said handle seats are positioned in generally parallel relation, said seat frames each comprising a channel surrounding said handle openings and opening upwardly when the handle seats are in generally horizontal seating position, seat cushioning means secured in the channels of said seat frames, said cushioning means being exposed upwardly above the open tops of said channels to provide a cushioned seat about the handle openings when the seat frames are in seating position and brought face to face and covered along the outer sides by the bottoms of said seat frames when said seat frames are folded into generally parallel relation to form a handle, and the inner peripheries of the handle opening being continuous and disposed within the cushoned seats and integral ears on each of said seat frames for pivoting said frames to said cane part.

6. A cane seat comprising an upright cane part, a pair of handle seats pivoted upon the upper end of said cane part and adapted to swing outwardly away from one another into generally horizontal position to form a seat and inwardly into generally parallel relation to form a handle, said handle seats each comprising a frame of loop-shaped form defining handle openings through which the hand may be passed for carrying the cane seat when said handle seats are positioned in generally parallel relation, said seat frames each comprising a channel surrounding said handle openings and opening upwardly when the handle seats are in generally horizontal seating position, seat cushioning means embedded in the channels of said seat frames, said cushioning means being exposed upwardly above the open tops of said channels to form cushioned seats about the handle openings when the seat frames are in seating position, the sides of said channels having inwardly extending edges and said cushioning means having portions extending under the inwardly extending edges of said channels.

JOSEPH SILVERMAN.